Aug. 12, 1941.  G. R. YOUNG  2,252,538
SOLDERING IRON
Filed Jan. 25, 1940
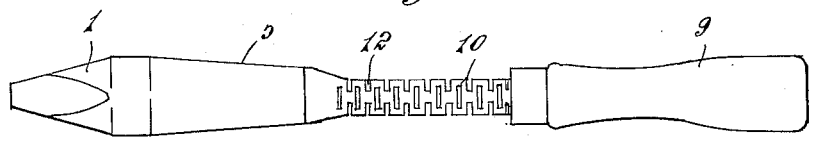
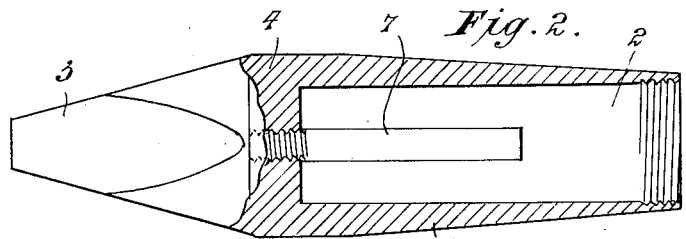
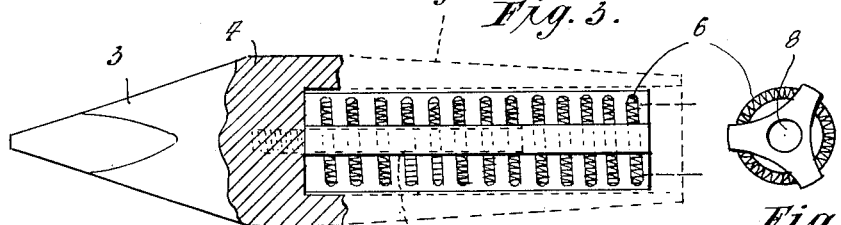
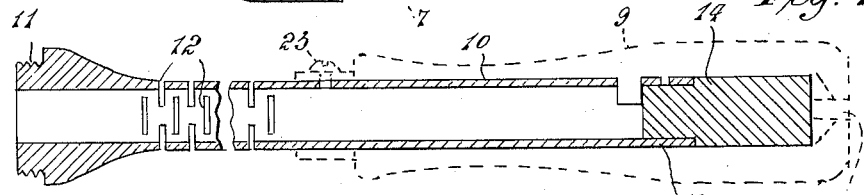
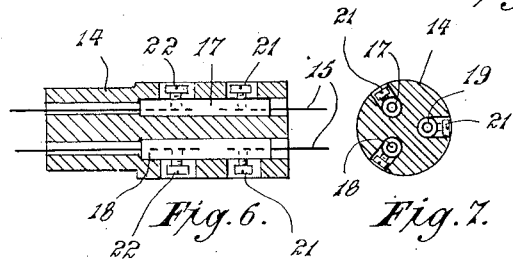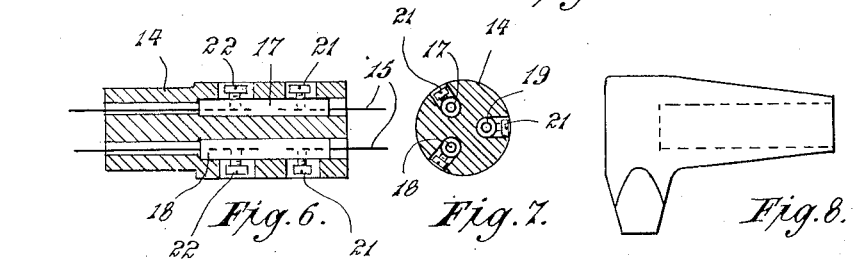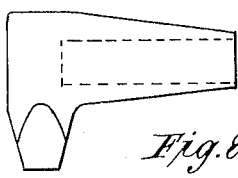
Inventor,
G. R. Young
By: Glascock Downing & Seebold
Attys.

Patented Aug. 12, 1941

2,252,538

UNITED STATES PATENT OFFICE 2,252,538

SOLDERING IRON

George Richard Young, Onehunga, Auckland, New Zealand

Application January 25, 1940, Serial No 315,581
In New Zealand February 13, 1939

2 Claims. (Cl. 219—26)

This invention relates to soldering irons heated by electricity, and particularly relates to that type of soldering iron in which the copper head contains therein a heating element having its leads passing through a handle and connected to the source of power.

The object of the present invention is to improve the construction and efficiency of this type of soldering iron.

According to the present invention the bit of the soldering iron has a mass of metal, from one side of which the working end of the bit projects, and from the other side of which an element chamber portion projects, the wall of the element chamber tapering so that such wall where it joins the mass is relatively thick compared with the end of such chamber. Therefore heat from the element which impinges upon the inner side of the element chamber will travel along the tapered wall in the direction of the thicker metal, that is to say towards the mass of metal forming the working head of the bit.

The advantage of such a construction in an electric soldering iron is that the heat is led to the working mass, which acts as a heat reservoir and is as near the working point as possible.

The handle is attached to the head by means of a tubular portion secured to the end of the element chamber. This tubular piece is provided with a number of transverse openings or saw-cuts in its length staggered in relation one to the other, so as to leave a longer path for the conduction of heat from the head to the handle, the openings also allowing air to pass through them thereby retaining the handle end of the tube cool.

The invention will be described with the aid of the accompanying drawing, wherein—

Figure 1 represents an assembled view of the soldering iron.

Figure 2 shows a cross section of the bit of the soldering iron.

Figure 3 shows a fragmentary cross section of the bit with the heating element in position.

Figure 4 is an end view of the heating element.

Figure 5 is a sectional elevation of the tubular shaft by which the head is connected with the handle.

Figure 6 is a longitudinal section, and

Figure 7 a cross section of the terminal box.

Figure 8 shows diagrammatically an alternative design of the working end of the bit.

Referring to the drawing, the bit 1 of the soldering iron is formed with an annular space or recess 2 forming an element chamber having an opening towards the handle end and away from the working end 3. A considerable mass of metal 4 is provided from where the working end 3 commences to taper and it will be seen that this mass has the largest diameter and is cylindrical for a portion of its length. It will be seen that the external wall of the element chamber tapers from this mass 4 towards the handle end as at 5. The inner surface of the element chamber is cylindrical so that the wall of the chamber tapers from a comparatively thick wall to a comparatively thin wall of metal. Into this chamber the element 6 (see Figure 3) is capable of being slid. A column 7 of copper projects from the bottom of the element chamber, being held therein by being threaded. The element may be of any usual construction, the one illustrated having a central opening 8 so that the element may be pushed over and surround the column 7. It will be obvious that the cross sectional shape of the element chamber may be varied.

It is well known that heat travels through a heat conducting medium by the widest path and, therefore, heat from the element which impinges upon the inner side of the element chamber will travel along the tapered portion 5 in the direction of the thicker metal, that is to say, towards the mass of metal 4 from which projects the working end 3 of the bit.

The advantage of such a construction in an electric soldering iron is that heat is led to the working mass, the thickest portion acting as a heat reservoir as near the working point as possible.

An elongated heating surface may thus be employed, without the unnecessary loss of heat that would result from a cylindrical external shape, so that heat from the thinnest part is transferred through the widening wall of metal to the working point, thereby enabling the maximum heat to be transferred to such working point.

An advantage of this construction is that it avoids weight of metal where it is unnecessary and where it would tend to interfere with the proper balance of the soldering iron.

The handle 9 is connected to the bit by means of a tubular portion 10 which may be secured to the open end of the element chamber as by a shoulder 11 which is threaded and screwed into the end of the element chamber. This tubular piece is provided with a number of transverse openings or saw cuts 12 made along its length and staggered in relation one to the other, so as to leave a path considerably longer than the tube itself for the conduction of heat from the chamber to the handle. The openings also allow air to pass freely through the tube. It has been found that the longer path and the openings tend to retain the handle end of the tube very cool. The end of the tubular portion 10 that is inserted into the opening in the bit will bear against the end of the element when the latter is in place in the tube.

The other end 13 of the tubular portion 10 is provided with a terminal box 14 of insulating material through which the conducting wires 15 are led from a suitable source of current, such wires having been previously led through the opening 16 in the handle. The conducting wires are connected to phase and neutral connecting tubes 17 and 18 situated in the box 14, while the earth wire is connected to a similar earthing tube 19, and are held in contact by screws 21. Similar screws 22 also secure the wires from the element 5 to the tubes, such wires being insulated in any approved fashion. The handle 9 is secured on the tube 10 by a screw 23.

Figure 8 shows a hatchet form of bit.

What I claim is:

1. In a soldering iron adapted to be heated by an electrical element within a hollow bit, said bit having a mass of metal from one side of which the working end of the bit projects, an element chamber portion projecting from the other side of the mass of metal, said element chamber portion having its enclosing wall tapering from the mass of metal so that the wall where it joins the mass is relatively thick compared with the outer end of such chamber.

2. In a soldering iron adapted to be heated by an electrical element within a hollow bit, said bit having a mass of metal from one side of which the working end of the bit projects, an element chamber portion projecting from the other side of said mass of metal, said element chamber portion having its enclosing wall tapering from the mass of metal so that the wall where it joins the mass is relatively thick compared with the outer end of said chamber, the chamber of cylindrical form extending into the mass of metal, a central column of metal projecting from the mass of metal into the chamber, a heating element supported on said column, and a tubular member to receive the handle fixed into the open end of the element chamber portion through which member the wires from element are carried.

GEORGE RICHARD YOUNG.